United States Patent [19]

Thus

[11] Patent Number: 4,933,563
[45] Date of Patent: Jun. 12, 1990

[54] INFRA-RED RECEIVER

[75] Inventor: Franciscus J. M. Thus, Eindhoven, Netherlands

[73] Assignee: U.S. Philips Corp., New York, N.Y.

[21] Appl. No.: 235,251

[22] Filed: Aug. 22, 1988

[30] Foreign Application Priority Data

Aug. 26, 1987 [GB] United Kingdom ............... 8720088

[51] Int. Cl.$^5$ ............................ G01J 1/44; G01J 5/20
[52] U.S. Cl. ............................. 250/370.01; 250/338.4
[58] Field of Search ................ 250/370.01, 338.4, 349, 250/342, 369, 370.14; 357/30

[56] References Cited

U.S. PATENT DOCUMENTS 4,793,704 12/1988 Hagner ........................ 250/370.01
4,803,363 2/1989 Gaalema et al. ............... 250/370.01

OTHER PUBLICATIONS

Philips Technical Publication 167, Mar. 22, 1985, "IR Transmitter & Receiver".

Primary Examiner—Janice A. Howell
Assistant Examiner—Richard Hanig
Attorney, Agent, or Firm—William L. Botjer

[57] ABSTRACT

A infra-red receiver for use in applications such as remote control of consumer equipment and receiving audio signals modulated on an IR carrier. The receiver comprises an IR diode (10) which is operated in its forward mode so that it constitutes a current source. The IR diode (10) is connected in an amplifying circuit which includes means (16) for detecting low frequency interference components in the signal and in response to the detection of these interference components temporarily shorts out the IR diode.

8 Claims, 1 Drawing Sheet

INFRA-RED RECEIVER

BACKGROUND OF THE INVENTION

The present invention relates to an infra-red (IR) receiver having particular, but not exclusive, applications in the transmission of audio on an IR carrier and in remote control applications for audio equipment.

Technical publication 167 by Philips Export BV and release on Mar. 22, 1985 discloses low-power remote control IR transmitter and receiver pre-amplifiers. Infra-red radiation is detected by a photodiode and the electrical signal produced is filtered in an inductive-capacitive filter before being applied to a narrow-band IR receiver of a type TDA 3047/3048 which operates at five volts.

There is now a demand for an infra-red receiver circuit which is so compact that it can be fabricated by integration and which can be operated at about one volt from a single cell battery.

This known circuit can not fulfil these requirements because it is designed to be operated at 5 volts to be compatible with other circuitry, such as a micro-processor, which is included in the control circuit. Additionally an L-C filter cannot per se be integrated because of the coil. A filter is necessary to eliminate interference from sources of light such as incandescent lamps and ambient sunlight. Finally in this known circuit the infra-red diode (or photodiode) is used in a reverse mode in which it dissipates energy from the power supply. In the case of the IR receiver being built-into a mains powered T.V. receiver such a dissipation can be tolerated. However this dissipation is undesirable when using a single cell because under bright light conditions the drain can be as high as 1 mA.

SUMMARY OF THE INVENTION

An object of the present invention is to provide an integrable IR receiver capable of operating at voltages of the order of 1.2 volt.

According to the present invention there is provided an infra-red (IR) receiver comprising an IR diode connected in its forward mode so that it acts as a current source.

The present invention also provides an infra-red (IR) receiver comprising an infra-red signal sensing diode connected in its forward mode, a first signal path connected between the anode and cathode electrodes of the IR diode, means for detecting low frequency components in the infra-red signal sensed by the diode, the first signal path including a switch device which is operable in response to the detection of the low frequency components by said means to short circuit said diode, a second amplifying signal path connected to the anode and cathode of said diode, and a current source connected to the second amplifying path, said current source having a high impedance to earth to inhibit current flow from the second amplifying path through the current source to earth.

Operating the IR diode in its forward mode means that its forward voltage must be is less than 300 mV to form an active current source. Short circuiting the unwanted signal components such as visible light results in only the wanted components being amplified.

The means for detecting the low frequency components comprises a low pass filter of a first or higher order.

In an embodiment of the present invention the second amplifier path comprises a current mirror which provides a current gain of the order of two. More particularly the IR diode is connected in the reference current path of the current mirror. The mirrored current path includes a transistor connected in grounded base configuration. A load, for example a demodulator, is connected in the mirrored current path.

BRIEF DESCRIPTION OF THE DRAWINGS

The present invention will now be described, by way of example, with reference to the accompanying drawings.

In the drawings corresponding features have been indicated by the same reference numerals.

DETAILED DESCRIPTION OF THE INVENTION

Figure 1:
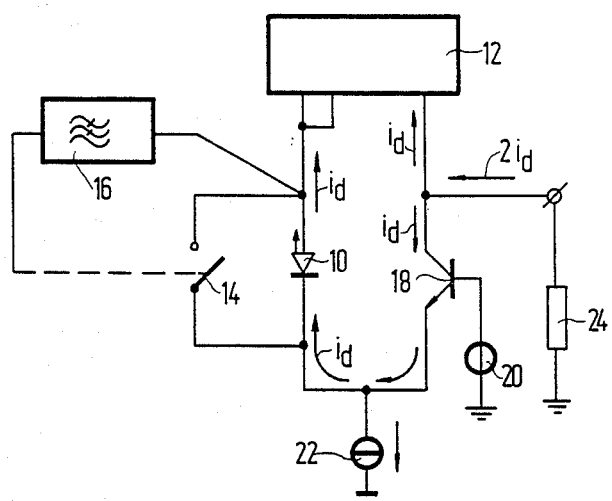
FIG. 1 is a circuit diagram, partly in block form, of an embodiment of an IR receiver made in accordance with the present invention.

Referring to FIG. 1, the IR receiver comprises an IR-diode 10 connected in its forward biassed mode in the reference current path of a current mirror amplifier 12. A switch 14 is connected in parallel with the IR diode 10. When the switch 14 is closed then the IR diode 10 is short circuited so that no current is drawn by the IR diode 10. Alternatively when the switch 14 is opened then the IR diode 10 behaves as an active current source.

The operation of the switch 14 is controlled by a low pass filter 16 which passes unwanted signal components due to say visible light. The signal components which are up to 20 kHz are used to regulate the closing of the switch so that the unwanted signal components circulate in the loop formed by the closing of the switch and are attenuated. The filter 16 is a low order filter, the choice being determined having regard to obtaining an adequate difference between the wanted and unwanted signal components and to the IR receiver being able to operate at 1.2 volts.

The remainder of the IR receiver comprises the mirrored current path of the amplifier 12, which path includes an NPN transistor 18 connected in grounded base configuration. The base electrode of the transistor 18 is maintained at a fixed voltage by a bias voltage source 20.

A d.c. current source 22 has one side connected to a junction of the emitter of the transistor 18 and the cathode of the IR diode and its other side connected to ground. The source 22 has a high impedance to ground so that signal current in the amplifier circuit does not pass through the source 22.

A load 24 comprising for example a demodulating circuit is connected to the collector circuit of the transistor 18.

Assuming the switch 14 to be open as shown the IR diode 10 is forwarded biassed by substantially 100 mV so that it acts as a current source. In operation a signal current gain of two is obtained because a current of $2i_d$ is drawn through the load by utilising both the anode current and the cathode current of the IR diode 10. Half of this signal current, $i_d$ passes through the collector-emitter path of the transistor 18 and the IR diode 10 whilst the other half flows to the current mirror amplifier 12.

When the switch 14 is closed then the IR diode 10 is short-circuited inhibiting the forward biassing of the diode and in so doing preventing current from being drawn from the supply 22.

Figure 2:
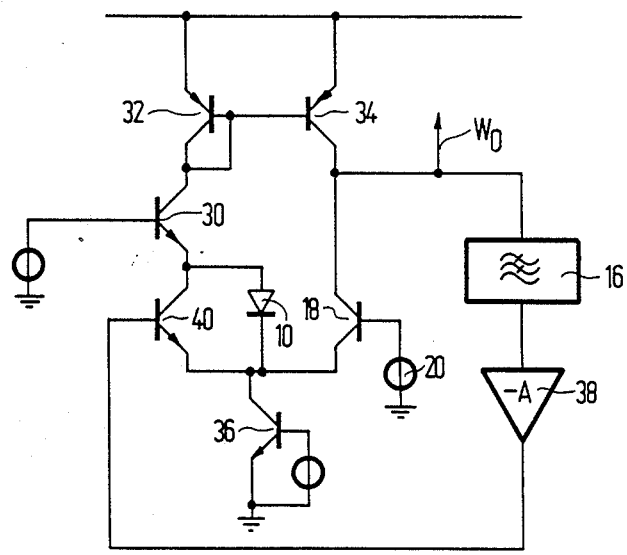
FIG. 2 is a circuit diagram of a second embodiment of an IR receiver implemented in bipolar technology.

FIG. 2 illustrates a practical embodiment of the present invention implemented in bipolar technology. In view of the fact that the illustrated receiver operates from an one volt supply the junctions in the transistors are made large in order to reduce their base-emitter voltage.

The amplifier comprises a current mirror formed by a grounded base NPN transistor 30 whose collector is connected to a diode connected PNP transistor 32. The current through the transistors 30, 32 is mirrored by a PNP transistor 34 whose collector is connected to the collector of the grounded base NPN transistor 18. The anode of the IR diode 10 is connected to the emitter of the transistor 30 and its cathode is connected to the emitter of the transistor 18. A current source represented by NPN transistor 36 has its collector connected to the junction of the IR diode 10 and the emitter of the transistor 18 so that the circuit has a long tailed pair configuration. The output signal $W_O$ is derived from the collector of the transistor 34. Low frequency signal components in the output signal are selected by the low pass filter 16 and after amplification in an inverting amplifier 38 are applied to the base electrode of an NPN transistor 40 whose collector-emitter path is connected in parallel with the IR diode 10. The transistor 40 functions as a switch and if it is rendered conductive by a signal of sufficient amplitude on its base then the IR diode current is short circuited and not drawn from the power supply. As the output signal $W_O$ collapses then the transistor 40 is rendered non-conductive. The operation of the remainder of the circuit is substantially the same as has been described already with reference to FIG. 1.

Although the circuit of FIG. 2 has been implemented in bipolar technology, other implementations may be done in other technologies such as CMOS or a combination of bipolar and CMOS termed BIMOS.

Figure 3:
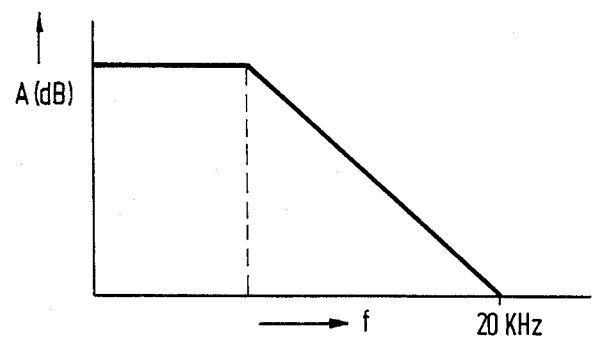
FIG. 3 is a frequency (f) versus amplitude (in dB) characteristic of a low pass filter suitable for use in the embodiments of FIGS. 1 and 2.

FIG. 3 illustrates a typical response characteristic of the low pass filter 16 which may be of a suitable first or second order type. As the main sources of interference are sunlight and artificial light sources for example incandescent lamps then a filter cut-off frequency of 20 kHz is considered adequate in order to have a low frequency gain which is high enough to discriminate between the required signal and the extraneous information.

What is claimed is:

1. An infra-red (IR) receiver comprising an IR diode connected in its forward mode so that it acts as a current source, means for detecting low frequency interference components in a signal produced by the IR diode and means to short-out the IR diode in response to the detection of the interference components.

2. A receiver as claimed in claim 1, wherein the detecting means comprises a low pass filter.

3. An infra-red (IR) receiver comprising an infra-red signal sensing diode connected in its forward mode, a first signal path connected between the anode and cathode electrodes of the IR diode, means for detecting low frequency components in the infra-red signal sensed by the diode, the first signal path including a switch device which is operable in response to the detection of the low frequency components by said means to short circuit said diode, a second amplifying signal path connected to the anode and cathode of said diode, and a current source connected to the second amplifying path, said current source having a high impedance to earth to inhibit current flow from the second amplifying path through the current source to earth.

4. A receiver as claimed in claim 3, wherein the means for detecting the low frequency components comprises a low pass filter.

5. A receiver as claimed in claim 6, wherein the filter is a low order filter.

6. A receiver as claimed in claim 3, wherein the second amplifying path comprises a current mirror circuit.

7. A receiver as claimed in claim 6, wherein the infra-red diode is connected in the reference current path of the current mirror and the mirrored current path includes a transistor connected in grounded base configuration, and wherein a load is connected to the mirrored current path.

8. A receiver as claimed in claim 3, wherein the power supply comprises a 1.2 volt source.

* * * * *